United States Patent [19]
Black et al.

[11] Patent Number: 5,613,081
[45] Date of Patent: Mar. 18, 1997

[54] METHOD OF OPERATING A DATA PROCESSOR WITH RAPID ADDRESS COMPARISON FOR DATA FORWARDING

[75] Inventors: Bryan P. Black; Marvin A. Denman, both of Austin, Tex.

[73] Assignee: Motorola, Inc., Schaumburg, Ill.

[21] Appl. No.: 526,398

[22] Filed: Sep. 11, 1995

Related U.S. Application Data

[63] Continuation of Ser. No. 205,428, Mar. 4, 1994, abandoned.

[51] Int. Cl.[6] .................................................. G06F 12/00
[52] U.S. Cl. ........................................ 395/403; 395/412
[58] Field of Search ............................... 395/375, 464, 395/450, 452, 403, 412

[56] References Cited

U.S. PATENT DOCUMENTS

| | | | |
|---|---|---|---|
| 4,371,924 | 2/1983 | Schaefer et al. | 395/464 |
| 4,788,641 | 11/1988 | Ishiguro et al. | 395/464 |
| 4,807,110 | 2/1989 | Pomerene et al. | 395/425 |
| 4,860,199 | 8/1989 | Langendorf et al. | 395/425 |
| 4,899,275 | 2/1990 | Sachs et al. | 395/425 |
| 4,956,803 | 9/1990 | Taylor et al. | 395/464 |
| 4,980,823 | 12/1990 | Liu | 395/464 |
| 4,991,081 | 2/1991 | Bosshart | 395/425 |
| 5,133,060 | 7/1992 | Weber et al. | 395/464 |
| 5,210,843 | 5/1993 | Ayers | 395/425 |
| 5,210,849 | 5/1993 | Takahashi et al. | 395/425 |
| 5,233,702 | 8/1993 | Emma et al. | 395/425 |
| 5,235,697 | 8/1993 | Steely, Jr. et al. | 395/464 |
| 5,276,853 | 1/1994 | Yamaguchi et al. | 395/425 |
| 5,287,482 | 2/1994 | Arimilli et al. | 395/425 |
| 5,307,477 | 4/1994 | Taylor et al. | 395/425 |
| 5,313,605 | 5/1994 | Huck et al. | 395/425 |
| 5,325,503 | 6/1994 | Stevens et al. | 395/425 |
| 5,345,560 | 9/1994 | Miura et al. | 395/250 |
| 5,361,391 | 11/1994 | Westberg | 395/464 |
| 5,375,216 | 12/1994 | Moyer et al. | 395/450 |
| 5,379,396 | 1/1995 | Gochman et al. | 395/425 |
| 5,392,410 | 2/1995 | Liu | 395/400 |
| 5,426,764 | 6/1995 | Ryan | 395/464 |
| 5,442,760 | 8/1995 | Rustad et al. | 395/375 |

*Primary Examiner*—Ayaz R. Sheikh
*Attorney, Agent, or Firm*—Lee E. Chastain

[57] ABSTRACT

A data processor (10) has an execution unit (18, 20) for generating the address of each requested data double-word. The data processor fetches the entire memory line, four double-words of data, containing the requested double-word when the requested double-word is not found in the data processor's memory cache. The data processor ultimately stores the requested data in the memory cache (40) when returned from an external memory system. The data processor also has forwarding circuitry (48, 50) for forwarding previously requested double-words directly to the execution unit under certain circumstances. The forwarding circuitry will forward a requested double-word if the data processor has not crossed a memory line boundary since the last memory cache miss and if the two least significant bits of the requested and received double-words logically match.

15 Claims, 2 Drawing Sheets

METHOD OF OPERATING A DATA PROCESSOR WITH RAPID ADDRESS COMPARISON FOR DATA FORWARDING

This application is a continuation of prior U.S. application Ser. No. 08/205,428, filed on Mar. 4, 1994, now abandoned, entitled "DATA PROCESSOR WITH MEMORY CACHE AND METHOD OF OPERATION", (original title).

FIELD OF THE INVENTION

The present invention generally relates to digital computing systems, and more specifically to a data processor with a memory cache.

BACKGROUND OF THE INVENTION

Data processing systems typically incorporate memory caches to improve system performance. A memory cache stores a subset of the contents of the data processing system's main memory that it frequently accesses. The contents of the memory cache may be data, may be instructions, or may be a combination of the data and instructions. A memory cache increases the performance of the data processor because the data processor can access the contents of the memory cache faster than it can access the contents of the main memory. The data processor can access the contents of the memory cache faster because the memory cache is (1) fabricated from faster components than is the main memory, (2) is accessed by the data processor through a dedicated bus, (3) is integrated on to the same semiconductor device as is the data processor, or (4) any combination of (1), (2) and (3).

A data processor incorporating a memory cache firsts determines if its memory cache contains a requested piece of data before requesting the data from a location in main memory. If the memory cache does contain the data, a "cache hit," then the data processor can quickly access and use the data. If the memory cache does not contain the data, a "cache miss," then the data processor must request the data from main memory. This process can take a relatively long time to complete.

Some data processors employ a data forwarding structure to reduce the interval between the time a cache miss occurs and the time the data is available for use by the data processor. A data forwarding structure compares the address of the data returned from main memory as it comes into the memory cache with the address of whatever data, if any, is presently being requested from the memory cache. If these two addresses match, then the memory cache forwards the data to the portion of the data processor that is requesting the data. The memory cache also stores the data in the memory cache for later use. If the two addresses do not match, then the portion of the data processor that is requesting the data accesses the memory cache as described above. This methodology is particularly useful in data processors that store instructions in one memory cache, an "instruction cache," and that store data in a second memory cache, a "data cache." This type of architecture is known as a "Harvard architecture." In an instruction cache, it is often the case that the address of the incoming instruction and the address of the requested instruction match. Therefore, the requested instruction will be available for execution one or more cycles earlier than without the data forwarding structure.

A data forwarding structure is not without its disadvantages. Primarily, data processors that employ data forwarding structures also incorporate address mapping. This combination is problematic. Data processors that incorporate address mapping use one address to internally index each memory location, "an effective address," and a second address to externally index each memory address, "a physical address." These data processors maintain one or more tables to translate between the two indexing systems when transferring data between the data processor and the external data processing system. A data forwarding structure must perform an address comparison between two addresses which are both physical addresses. This requirement implies that the data forwarding structure must serially translate the effective address of the requested data into a physical address, compare the two addresses described above, and then select a source from which it will supply the requested data. Although these steps are straight forward, they may require more time to complete than any other combination of steps performed by the instruction cache, the instruction cache's "speed path."

SUMMARY OF THE INVENTION

In accordance with the present invention, there is disclosed a data processor having a memory cache which substantially eliminates disadvantages of known data processors.

A method of operating a data processor is described. The method has the steps of generating an address of a first requested data line by an execution unit and requesting a plurality of data lines from a memory system. The plurality of data lines includes the first requested data line. The method also comprises the steps of generating an address of a second requested data line by the execution unit, determining whether the plurality of data lines includes the second requested data line, and asserting a control signal responsive to the step of determining. The data processor forwards a selected one of the plurality of data lines to the execution unit if a first subset of the address of the selected one of the plurality of data lines is logically equivalent to a first subset of the address of the second requested data line and if the execution unit asserts the control signal.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
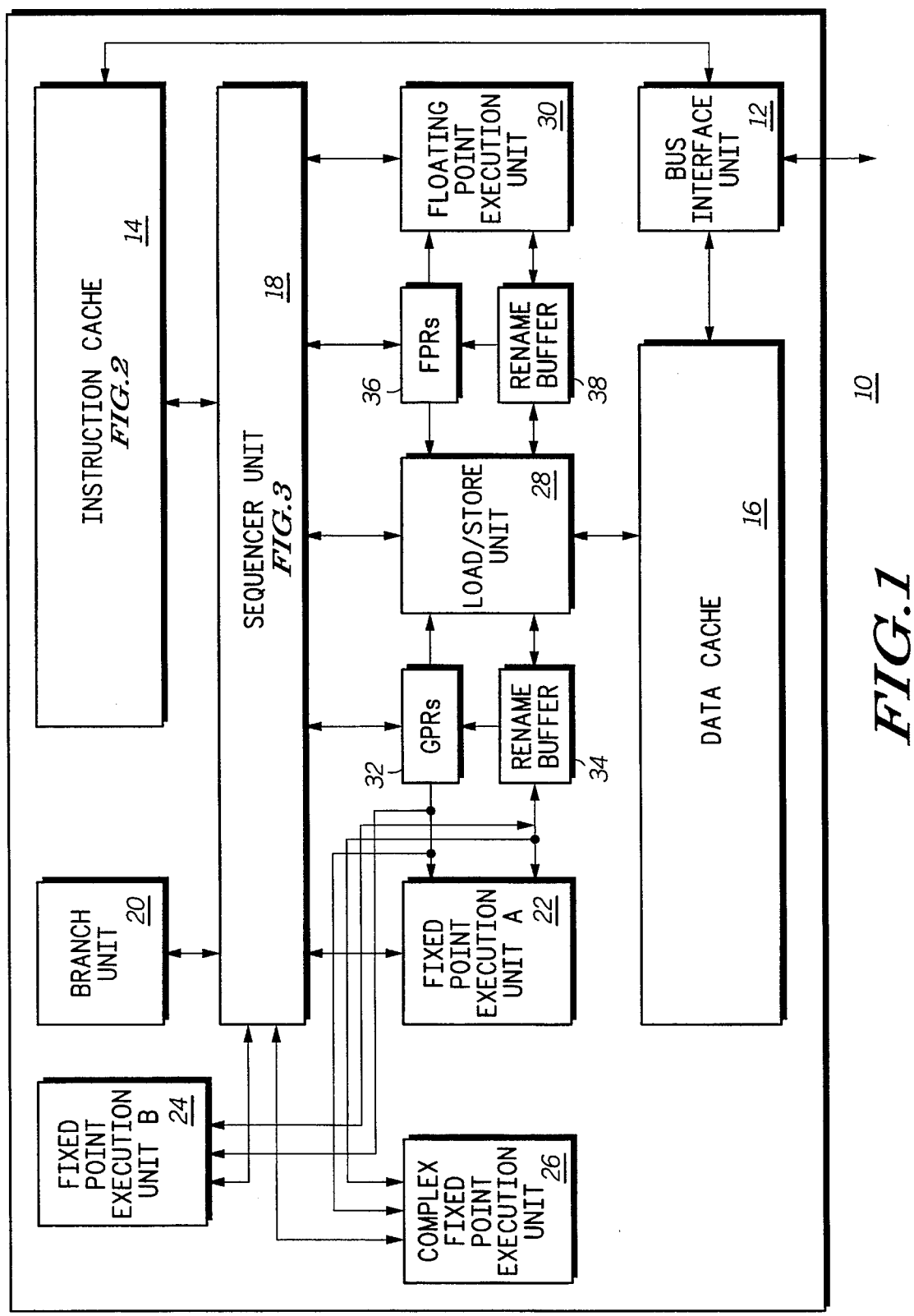
FIG. 1 depicts a block diagram of a data processor constructed in accordance with the present invention.

FIG. 1 depicts a block diagram of a data processor 10 constructed in accordance with the present invention. Data processor 10 is a data processor that improves its performance by storing frequently used data and instructions in a data cache and instruction cache, respectively. Data processor 10 also improves its performance by using a first effective address to index each possible internal memory location and a second real address to index each possible external memory location. Data processor 10 fetches two quad words (or four double-words, a "cache line") from main memory each time a request for a particular instruction misses in its instruction cache. Each cache line contains eight thirty-two bit instructions. Data processor 10 receives the cache line in four double-word pieces from main memory (not shown). Data processor 10 may forward a particular one of the double-words if the particular double-word is requested by some portion of data processor 10 when the instruction cache receives the particular double-word. However, data processor 10 does not have to translate the effective address of the received double-word into a physical address as part of the data forwarding process. Instead, data processor 10 determines when it crosses a cache line boundary by monitoring the effective address presented to the instruction cache each clock cycle. If data processor 10 continues to request instructions from the same cache line, then data processor 10 need only compare the two least significant bits ("LSBs") of the requested and received data addresses to decide whether or not to forward a particular double-word. If data processor 10 requests instructions from a different cache line, then data processor 10 will not forward the double-word. According to the disclosed invention, data processor 10 can forward instructions for execution without incurring the timing penalty associated with a full virtual-to-physical address translation.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a sequencer unit 18. Instruction cache 14 is more fully described below in connection with FIG. 2. Sequencer unit 18 forwards individual instructions to an appropriate execution unit. Sequencer unit 18 is more fully described below in connection with FIG. 3. Data processor 10 has a branch unit 20, a fixed point execution unit A22, a fixed point execution unit B24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. Floating point execution unit 26 and load/store execution unit 28 read and write their results to a floating point architectural register file 36, (labeled FPRs and hereafter FPR file) and to a second rename buffer 38.

The operation of data processor 10 without the disclosed instruction forwarding methodology is known in the art. In general, sequencer unit 18 and branch unit 20 determine what sequence of programmed instructions is appropriate given the contents of certain data registers and the instructions themselves. Instruction cache 14 provides this sequence of programmed instructions to sequencer 18. If instruction cache 14 does not contain the required instructions, then it will fetch them via BIU 12, from a main memory system external to data processor 10 (not shown).

Sequencer unit 18 issues the individual instructions of the sequence of programmed instructions to the various execution units 20, 22, 24, 26, 28 and 30. Each of the execution units performs one or more instructions of a particular class of instructions. The particular class of instructions of each execution unit is indicated by the name of the execution unit. For instance, fixed point execution units A and B perform simple mathematical operations on operands expressed in fixed point notation such as addition, subtraction, ANDing, ORing and XORing. Complex fixed point execution 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Sequencer unit 18 coordinates this updating. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, first rename buffer 34, FPR file 36 or second rename buffer 38 and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to first rename buffer 34 or second rename buffer 38. If data cache 16 does not contain the required data, then it will fetch it from the main memory system external to data processor 10 via BIU 12.

The operation of data processor 10 with the disclosed instruction cache is described below in connection with FIGS. 2 and 3. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining." In the depicted embodiment, each instruction is broken into five discrete steps: fetch, decode, dispatch, execute, and completion.

In the fetch stage, memory management circuitry (not shown) within instruction cache 14 retrieves one or more instructions beginning at a memory address identified by sequencer unit 18 or by branch unit 20 in the prior clock cycle.

In the decode stage, instructions are decoded by the sequencer unit 18 into a number of control signals for use by subsequent stages.

In the dispatch stage, sequencer unit 18 routes each instruction to the appropriate execution unit after determining that there are no impermissible data or resource dependencies and after reserving a rename buffer entry for the result of the instruction. The dispatch stage is also responsible for supplying operand information for the instructions being dispatched.

In the execute stage, each particular execution unit executes its programmed instruction. Results, if any, are returned either to rename buffer 34 or rename buffer 38, respectively, for integer and floating point results.

In the completion stage, sequencer unit 18 updates the architectural register files with the result of a particular instruction stored in a rename buffer after every instruction preceding the particular instruction has so updated the architectural register file. The completion stage also updates all other architectural states in the machine after every instruction preceding the particular instruction has so updated the architectural state.

Generally, each instruction stage takes one machine clock cycle. However, some instructions, such as complex fixed point instructions, require more than one clock cycle to execute. Therefore, there may be a delay between the execution and completion stages of a particular instruction due to the range of times which previous instructions may have taken to execute.

Figure 2:
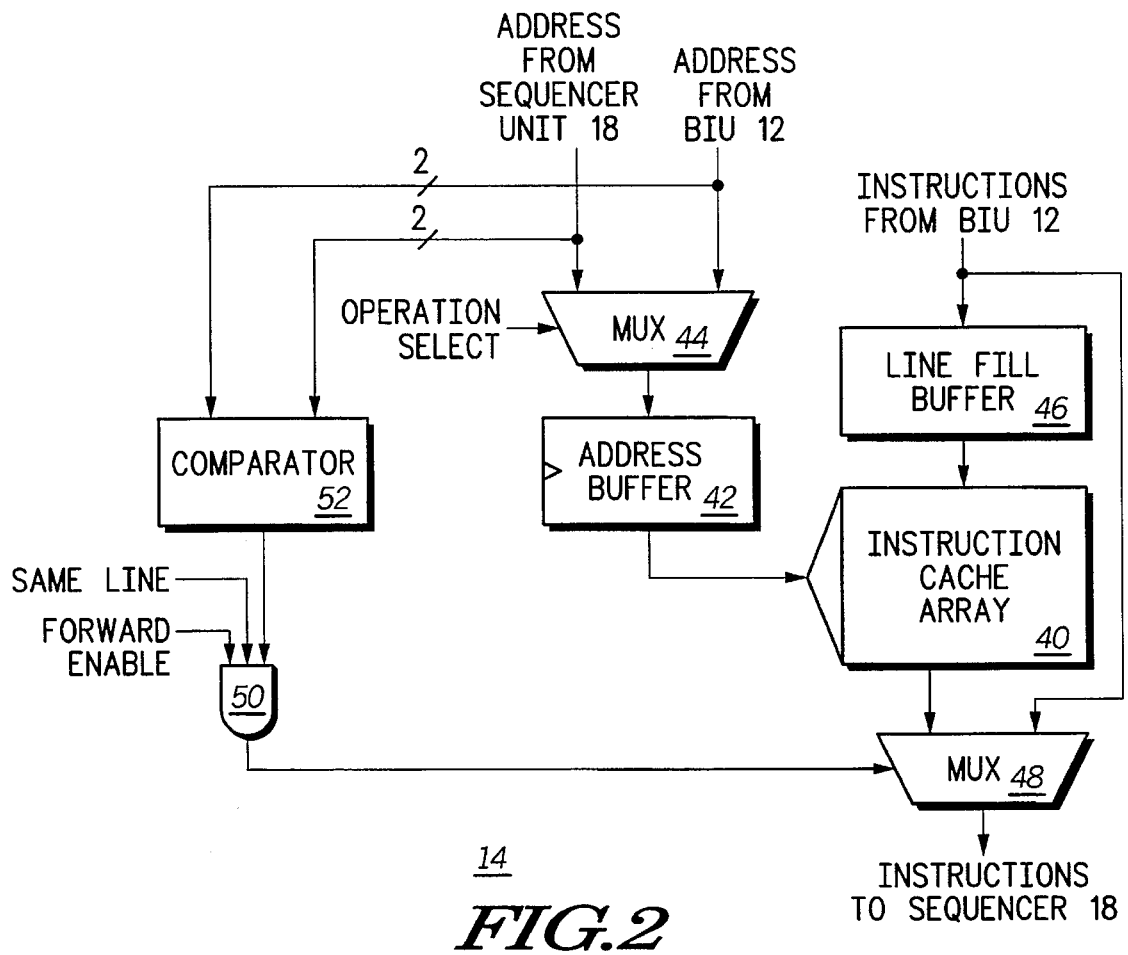
FIG. 2 depicts a block diagram of the instruction cache depicted in FIG. 1.

FIG. 2 depicts a block diagram of instruction cache 14 depicted in FIG. 1. Instruction cache 14 contains an instruction cache array 40 which is a four-way set associative cache array. All cache line information is stored in static random access memory ("SRAM") bit-cells. Instruction cache array 40 stores instructions in a plurality of cache lines each 256 data bits in length. A particular cache line in instruction cache array 40 is indexed by the contents of an address buffer 42. Address buffer 42 latches data output from a multiplexer 44. Multiplexer 44 receives a control signal "OPERATION SELECT" that selects the output of multiplexer 44. Multiplexer 44 either outputs a fetch address from sequencer unit 18 or a bus transaction address from BIU 12.

Instruction cache array 40 receives data which it is to store from a line fill buffer 46. Line fill buffer 46 latches instruction data received from main memory (not shown) via BIU 12. An output of a multiplexer 48 forwards data to sequencer unit 18. An output of a three-input AND gate 50 selects whether multiplexer 48 will forward data received from BIU 12 or output data stored in instruction cache array 40. AND gate 50 receives a control signal SAME LINE, a control signal FORWARD ENABLE, and an output of a two-bit comparator 52. The control signal SAME LINE is described below in connection with FIG. 3. BIU 12 asserts the control signal FORWARD ENABLE when it is servicing a cache miss. BIU 12 deasserts the control signal FORWARD ENABLE after it completes servicing the cache miss. Cache misses are described below. Comparator 52 compares the two least significant bits (hereafter LSBs) of the fetch address of the requested data (supplied by sequencer unit 18) and the bus transaction address from BIU 12, for equality. Comparator 50 asserts its output if the two LSBs are equal.

Instruction cache 14 performs two major functions and a variety of secondary functions. First, instruction cache 14 provides instructions to sequencer unit 18. These instructions may be in instruction cache 14 when initially requested, a "hit" or may not be in instruction cache 14 when initially requested, a "miss." Second, instruction cache 14 forwards instructions to sequencer unit 18 under certain circumstances as it receives instructions from BIU 12.

During an instruction cache access, sequencer unit 18 asserts the control signal OPERATION SELECT, causing multiplexer 44 to select the instruction fetch address from sequencer unit 18. Address buffer 42 latches the instruction fetch address from multiplexer 44. As described above, the contents of address buffer 44 identifies a particular cache line within instruction cache 40. If the instruction word indexed by address buffer 42 currently resides in instruction cache array 40 then a "hit" occurs. If the instruction word indexed by address buffer 42 does not currently reside in instruction cache array 40 then a "miss" occurs.

In the case of a cache hit, the cache line associated with the fetch address from address buffer 42 is read and sent to multiplexer 48. The control signal FORWARD ENABLE is de-asserted during a cache hit. Therefore, the output of AND gate 50 is de-asserted causing multiplexer 48 to select the output of instruction cache array 40 to forward to sequencer unit 18.

In the case of a cache miss, instruction cache array 40 causes a subsequent fetch to main memory (not shown) via BIU 12. After a fixed memory latency, B IU 12 returns the instruction data and the corresponding fetch address to instruction cache 14. BIU 12 de-asserts the control signal OPERATION SELECT, causing multiplexer 44 to use the fetch address returned from BIU 12 to select a particular line in instruction cache array 40. At the same time, line fill buffer 46 latches the instruction data from BIU 12. Once line fill buffer 46 is full, instruction cache array 40 writes the contents of line fill buffer 46 into instruction cache array 40 at the data entry specified by address buffer 42. This operation is called an instruction cache line fill. In the depicted embodiment, line fill buffer 46 receives four double-words of instructions over the course of four clock cycles before it writes the contents of line fill buffer 46 to a data entry line in instruction cache array 40.

In addition to an instruction cache line fill operation, instruction forwarding may occur following a cache miss. Instruction forwarding will occur if the address of the requested instruction data is identical to the address of the returned instruction data when the two addresses are expressed in the same addressing scheme. During instruction forwarding, instruction data returned from B IU 12 bypasses instruction cache line fill buffer 46 and passes directly to sequencer unit 18. This strategy avoids the latency associated with writing from B IU 12 to line fill buffer 46 and with writing from line fill buffer 46 to instruction cache array 40.

As described above, instruction cache array 40 causes a fetch to main memory and BIU 12 asserts control signal FORWARD ENABLE after a cache miss. Sequencer unit 18 asserts the control signal SAME LINE if it is requesting instruction data contained in the same line in main memory as it requested after the previous cache miss. The control signal SAME LINE is described below in connection with FIG. 3. Comparator 52 compares the two LSBs of the virtual fetch address from sequencer unit 18 and the physical address from BIU 12. If they are equal, then comparator 52 asserts its output.

Functionally, the virtual address of the requested double-word and the real address of the returned double-word identify the same memory line even when the two addresses are expressed in different addressing schemes if they both select the same memory line and they both select the same double-word in that memory line. Therefore, AND gate 50 causes multiplexer 48 to forward instruction data to sequencer unit 18 when the output of comparator 52, the control signal SAME LINE, and the control signal FORWARD ENABLE are all asserted. In other embodiments, comparator 52 may compare other than two bits of the requested and returned instruction data addresses depending upon the capacity of line fill buffer 46 relative to the data path from BIU 12 to line fill buffer 46. Comparator 52 may compare other than two bits of the requested and returned instruction data addresses so long as the compared bits are not part of the address that is translated from an effective to a real address. Similarly, sequencer unit 18 may assert the control signal SAME LINE if the requested and returned addresses are both members of some memory block of a size other than a memory line (256 bits). Sequencer unit 18 will assert the control signal SAME LINE so long as the translated portion of both addresses are mapped to the same address.

Figure 3:
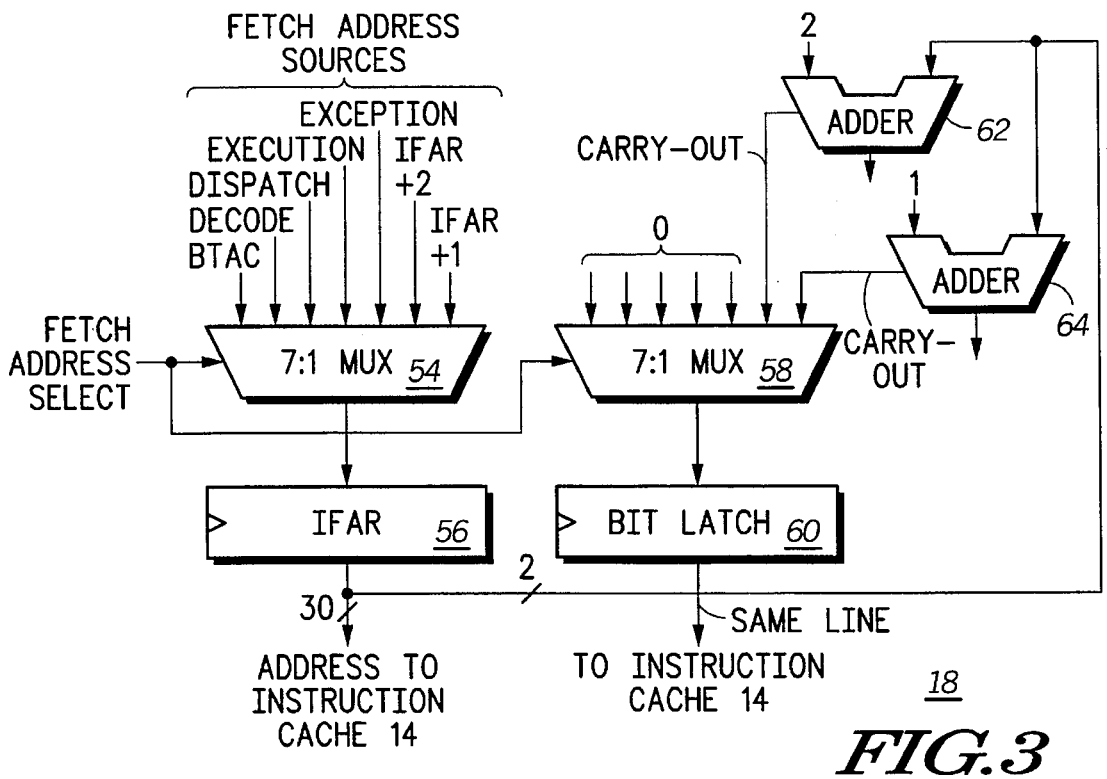
FIG. 3 depicts a block diagram of a portion of the sequencer unit depicted in FIG. 1.

FIG. 3 depicts a block diagram of a portion of sequencer unit 18 depicted in FIG. 1. A multiplexer 54 selects a new fetch address each clock cycle from seven different possible sources. A control signal FETCH ADDRESS SELECT selects one of the seven sources as the output of multiplexer 54. The output of multiplexer 54 is a virtual fetch address that identifies the location of the next instruction or group of instructions that data processor 10 should execute. The fetch address is latched by an instruction fetch address register (labeled and hereafter IFAR) 56 and forwarded to instruction cache 14 and to other parts of sequencer unit 18.

In the depicted embodiment, sequencer unit 18 and branch unit 20 generate the seven possible fetch addresses during the various stages of the five different pipeline stages. It should be noted that each of the (up to) seven fetch addresses generated by a particular branch instruction and the return of an exception address will occur at different stages in the pipeline. Conversely, two or more closely spaced branch instructions may cause sequencer 18 and branch unit 20 to forward two different fetch addresses to multiplexer 56 at the same time. In this second case, control signal FETCH ADDRESS SELECT will choose the fetch address generated in the later pipeline stage.

Three of the possible seven fetch address sources are generated during the fetch stage of data processor 10. First, a branch target address cache (a "BTAC," not shown) makes a fetch time branch prediction based upon the presence or absence of the contents of IFAR 56 in the BTAC. If the contents of IFAR 56 are stored in the BTAC, then the BTAC outputs a target address associated with the stored fetch address (labeled BTAC). The fetch stage also provides two sequential fetch addresses to multiplexer 54. Each of the two sequential addresses is an increment of the current fetch address contained in IFAR 56. Since the depicted embodiment can fetch two or four instructions in any given instruction cache access, the fetch stage provides an incremental fetch address for both cases. If instruction cache 14 returns two instructions to sequencer unit 18, then the contents of IFAR 56 incremented by two is needed (labeled IFAR+1). If instruction cache 14 returns four instructions to sequencer unit 18, then the contents of IFAR 56 incremented by four is needed (labeled IFAR+2).

The fourth input to multiplexer 54 is a decode branch prediction address generated by sequencer unit 18 during the decode pipeline stage (labeled DECODE). The decode branch prediction address is based on the predicted value of a special purpose CONDITION REGISTER (not shown). The value of the CONDITION REGISTER is predicted using a four-state branch prediction model (strong-taken, weak-taken, weak-not-taken, and strong-not-taken). The four states are stored in a direct mapped branch history table (a "BHT," not shown). Instructions that depend only upon the value of the CONDITION REGISTER are predicted in this way.

The fifth input to multiplexer 54 is a dispatch time branch prediction address generated by sequencer unit 18 during the dispatch pipeline stage (labeled DISPATCH). The dispatch branch prediction address is based on the predicted value of a special purpose COUNTER REGISTER (not shown). The value of the COUNTER REGISTER during the execution stage is predicted using the value of the COUNTER REGISTER during the dispatch stage. Instructions that depend upon the value of the COUNTER REGISTER or upon a combination of the COUNTER REGISTER and the CONDITION REGISTER are predicted in this way. (The value of the CONDITION REGISTER is assumed to be met in these CONDITION REGISTER-COUNTER REGISTER combination instructions.)

The sixth input to multiplexer 54 is the executed branch target address from branch unit 20 generated during the branch execute pipeline stage (labeled EXECUTION). This target address is not a prediction. It is based upon the actual values of the various special purpose registers and upon the branch instruction itself.

The seventh input to multiplexer 54 is the exception address generated by sequencer unit 18, during the completion pipeline stage (labeled EXCEPTION). Each instruction that data processor 10 executes may generate an exception if the instruction executes incorrectly. In these cases, each incorrectly executed instruction will return an address identifying where a subroutine resides in memory that can account for the incorrect instruction.

The control signal FETCH ADDRESS SELECT selects the branch correction address or exception address corresponding to the oldest instruction in data processor 10, if one or more is valid. Control signal FETCH ADDRESS SELECT selects the incremental address IFAR+2 if no branch correction or exception address is valid and if four instructions were fetched from instruction cache 14 in the present cycle. Control signal FETCH ADDRESS SELECT selects the incremental address IFAR+1 if no branch correction or exception address is valid and if none or two instructions were fetched from instruction cache 14 in the present cycle. (IFAR 56 does not latch the output of multiplexer 54 if no instructions are fetched in the present cycle.)

An output of a multiplexer 58 latched by a bit latch 60 generates the control signal SAME LINE each clock cycle from seven possible sources. The output of bit latch 60 is forwarded to instruction cache 14. As described above, the control signal SAME LINE indicates whether two consecutive fetch addresses index two double-words within the same double quad-word block of memory. The control signal FETCH ADDRESS SELECT selects one of the seven sources as the output of multiplexer 58.

Each of the seven sources to multiplexer 58 corresponds directly to one of the inputs of multiplexer 54. Statistically, each of the fetch address corrections and the exception address correction will generate a target address branching to a double-word in a different cache line or double quad-word block. Instruction forwarding will not be possible in these cases. Therefore, the BTAC prediction address, decode time prediction address, dispatch time prediction address, execute time address, and exception address inputs are always zero. The sixth possible input to multiplexer 58 is the carry-out bit of a first two-bit adder 62. Adder 62 adds two and the two LSBs of the contents of IFAR 56. The carry-out bit of adder 62 indicates whether a 256-bit boundary will be crossed by incrementing the contents of IFAR 56 by four instructions. The seventh possible input to multiplexer 58 is the carry-out bit of a second two-bit adder 64. Adder 64 adds one and the two LSBs of the contents of IFAR 56. The carry-out bit of adder 64 indicates whether a 256-bit boundary will be crossed by incrementing the contents of IFAR 56 by two instructions. As described above, the control signal FETCH ADDRESS SELECT selects the carry-out bit of adder 62 or adder 64 if four instructions were fetched in the present cycle and no address correction occurred or if only two instructions were fetched in the present cycle and no address correction occurred, respectively. (Bit latch 60 does not latch the output of multiplexer 58 if no instructions are fetched in the present cycle.)

Although the present invention has been described with reference to a specific embodiment, further modifications and improvements will occur to those skilled in the art. For instance, the disclosed invention may be incorporated into data processors traditionally classified as complex instruction set computers or CISC machines. Also, certain functional units may be omitted in certain embodiments or relocated to other areas of data processor 10. It is to be understood therefore, that the invention encompasses all such modifications that do not depart from the spirit and scope of the invention as defined in the appended claims.

What is claimed is:

1. A method of operating a data processor comprising the steps of:

generating an address of a first requested data line in an execution unit of a data processor;

requesting a plurality of data lines from a memory system external to the data processor, the plurality of data lines comprising the first requested data line;

generating an address of a second requested data line in the execution unit, the address of the second requested data line being a sum of the address of the first requested data line and a predetermined value;

determining whether the plurality of data lines comprises the second requested data line responsive to adding the predetermined value to the address of the first requested data line;

asserting a control signal responsive to determining that the plurality of data lines comprises the second requested data line;

receiving each one of the plurality of data lines in the data processor; and forwarding a selected one of the plurality of data lines to the execution unit before the selected one of the plurality of data lines is stored in a memory system internal to the data processor if a first subset of bits of the address of the selected one of the plurality of data lines is logically equivalent to a first subset of bits of the address of the second requested data line and if the execution unit asserts the control signal.

2. The method of claim 1 wherein the step of generating an address of a first requested dataline and the step of generating an address of a second requested data line further comprise the step of:

determining that the first requested data line is not present in a memory cache of the data processor; and determining that the second requested data line is not present in the memory cache, respectively.

3. The method of claim 2 wherein the step of generating an address of a first requested data line and the step of generating an address of a second requested data line further comprise the step of:

translating a second subset of bits of the address of the first requested data line; and translating a second subset of bits of the address of the second requested data line, respectively.

4. The method of claim 3 wherein the first and second requested data lines each comprise an instruction for execution in the data processor.

5. The method of claim 4 wherein the address of the first requested data line and the address of the second requested data line are logically equivalent.

6. The method of claim 1 wherein the step of generating an address of a first requested data line and the step of generating an address of a second requested data line further comprise the step of:

translating a second subset of bits of the address of the first requested data line; and translating a second subset of bits of the address of the second requested data line, respectively.

7. The method of claim 6 wherein the first and second requested data lines each comprise an instruction for execution in the data processor.

8. The method of claim 7 wherein the address of the first requested data line and the address of the second requested data line are logically equivalent.

9. The method of claim 1 wherein the first and second requested data lines each comprise an instruction for execution in the data processor.

10. The method of claim 9 wherein the address of the first requested data line and the address of the second requested data line are logically equivalent.

11. The method of claim 1 wherein the address of the first requested data line and the address of the second requested data line are logically equivalent.

12. A method of operating a data processor comprising the steps of:

generating an address of a first instruction in an execution unit of the data processor;

determining that the first instruction is not present in a memory cache of the data processor;

requesting a plurality of sequential instructions from a memory system external to the data processor, the plurality of instructions comprising the first instruction;

generating an address of a second instruction in the execution unit, the address of the second instruction being a sum of the address of the first instruction and a predetermined value;

determining whether the plurality of sequential instructions comprises the second instruction responsive to adding the predetermined value to the address of the first instruction;

asserting a control signal responsive to determining that the plurality of sequential instructions comprises the second instruction;

receiving each one of the plurality of sequential instructions in the memory cache; and forwarding a selected one of the plurality of sequential instructions to the execution unit before the selected one of the plurality of data lines is stored in the memory cache if a first subset of bits of the address of the selected one of the plurality of sequential instructions is logically equivalent to a first subset of bits of the address of the second instruction and if the execution unit asserts the control signal.

13. The method of claim 12 wherein the step of first generating and the step of second generating further comprise the step of:

translating a second subset of bits of the address of the first instruction; and translating a second subset of bits of the address of the second instruction, respectively.

14. The method of claim 13 wherein the address of the first instruction and the address of the second instruction are logically equivalent.

15. The method of claim 12 wherein the address of the first instruction and the address of the second instruction are logically equivalent.

* * * * *